Sept. 26, 1933.　　　　W. E. HADLEY　　　　1,927,979
SCRAPER DEVICE FOR DRUM TYPE FILTERING MACHINES
Filed Jan. 15, 1931　　　2 Sheets-Sheet 1
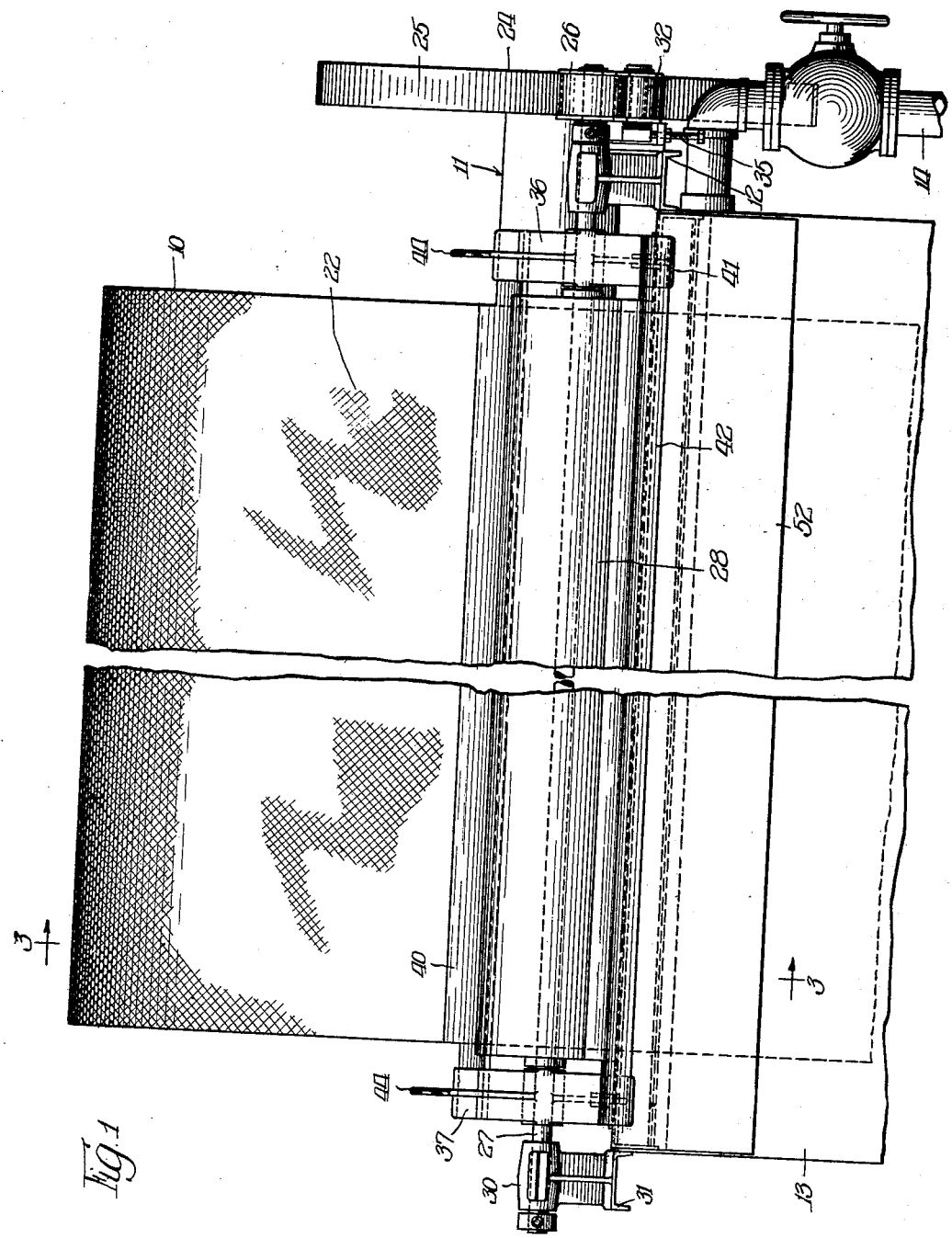
Inventor:
Walter E. Hadley,
By Ksina and Rauber
Attys.

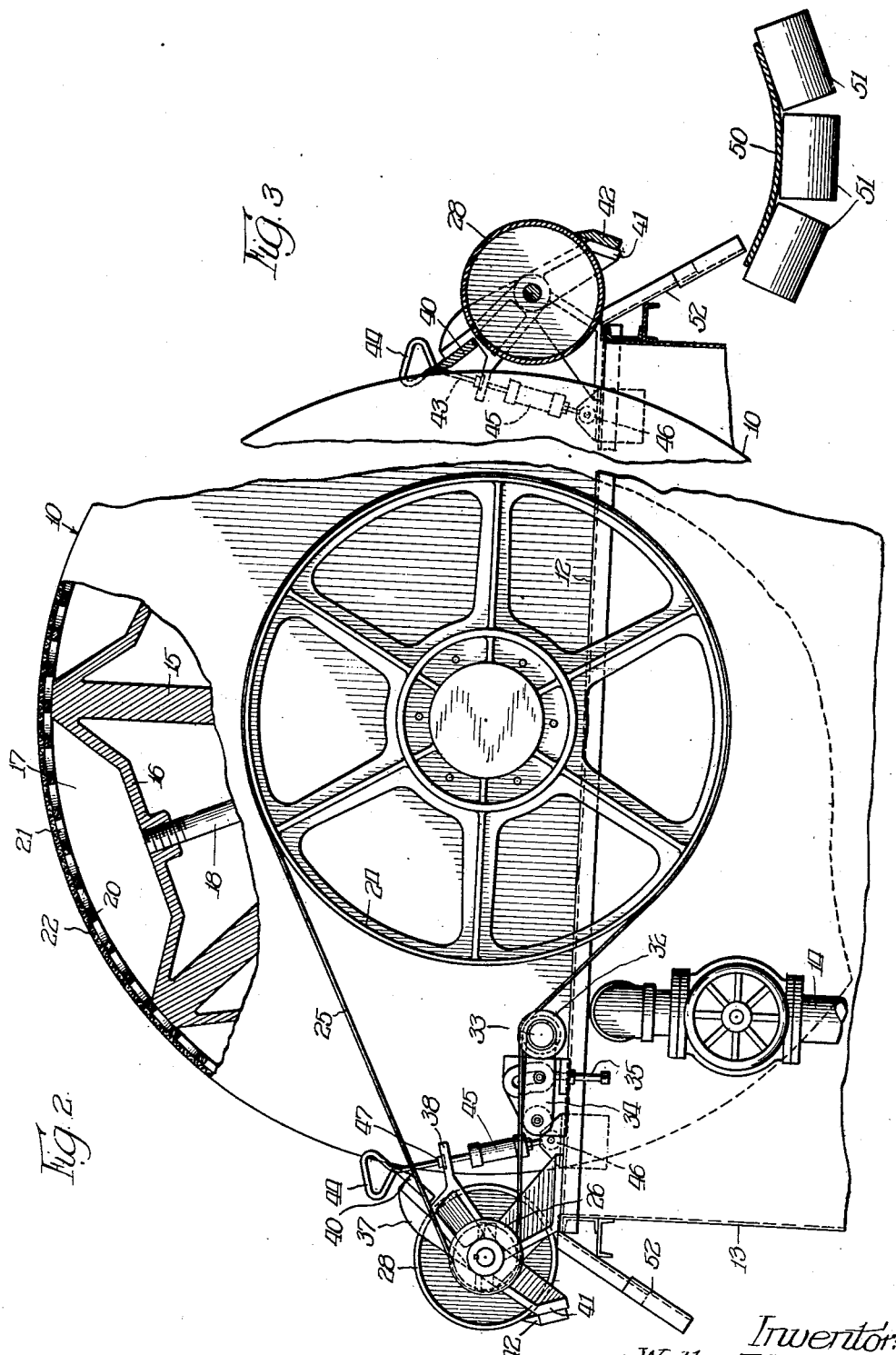

Patented Sept. 26, 1933

1,927,979

UNITED STATES PATENT OFFICE 1,927,979

SCRAPER DEVICE FOR DRUM TYPE FILTERING MACHINES

Walter E. Hadley, Gary, Ind.

Application January 15, 1931. Serial No. 508,951

1 Claim. (Cl. 210—201)

The invention relates to filtering apparatus and particularly to the revolving drum type of apparatus for extracting solid substances from water or other liquids.

An object of the invention is to provide a filtering device which will operate continuously and efficiently to extract fine flue dust from its concentrated liquor and to deliver filter of a uniform composition and uniform consistency for further operations.

Another object of the invention is to provide novel means for stripping the deposited filter from the surface of the separating means which will not require attention from an operator and which will discharge the filter cake in blocks of uniform size suitable for other operations, such as sintering.

In connection with this latter object the device of the present invention is adapted for association with a conventional type of extracting mechanism consisting of a large cylindrical drum divided into longitudinal compartments over which is stretched a permeable cloth such as canvas. This covered drum is partially immersed in the concentrated liquor and slowly revolved, and as the compartments are connected to a vacuum pump during their travel through the liquor, the liquid will be drawn through the canvas leaving a deposit of the filter on the surface of the drum. The present construction relates particularly to novel means for removing the filter from the extracting drum and depositing the same in a form suitable for further operations, the device being particularly designed to prevent the filter from building up on the removing means and forming lumps. The present invention therefore functions to remove the filter cake in a continuous discharge, thus giving a regular product of a uniform size and which will not require the services of an attendant to periodically clean the removing means.

Another object of the present invention is to provide a device of the type described which will be simple in construction, efficient and practical in operation and fulfilling all requirements of manufacture and service.

With these and various other objects in view, the invention may consist of certain novel features of construction and operation, as will be more fully described and particularly pointed out in the specification, drawings and claim appended hereto.

In the drawings, which illustrate an embodiment of the device and wherein like reference characters are used to designate like parts—

Figure 1 is an end elevational view of the scraper device for filtering machines constructed in accordance with the present invention;

Figure 2 is an elevational view, parts being shown in section of the apparatus shown in Figure 1; and Figure 3 is a detail sectional view showing the association of the scraper bars with the main drum and roller.

Filtering machines of the type disclosed found extensive commercial use in connection with the extraction of fine flue dust encountered in the discharge water from blast furnace gas washers. The blast furnace dust is carried away by the water to settling basins, where the same is partly concentrated to a pulp holding approximately fifty per cent moisture.

In treating this pulp on the filtering machines, it is possible to further reduce the moisture substantially making a cake which can be sintered, the product having the same composition and physical properties of iron ore. The extracting drum 10 is mounted upon a shaft 11 journaled for rotation upon transverse beams 12 forming part of any suitable tank 13. The tank is adapted to be partly filled with the concentrated liquor by means of the supply pipe 14, the drum 10 therefore being only partly immersed in the liquor.

For extracting the solids in suspension the drum 10 is provided with a plurality of radial arms 15 connected by portions 16, forming the drum into a plurality of compartments 17. Each compartment is connected to a pipe 18, which, by means of a rotary valve, not shown, connected to both pressure and vacuum pumps, will cause the compartments to be alternately placed under vacuum and pressure, according as to whether they are immersed in the liquid or located adjacent the scraper device to be described. Forming the periphery of the drum is a cylindrical member 20 preferably of sheet metal having a plurality of perforations 21 of desired size, through which the liquid can readily pass. Stretched over the cylindrical member to form the outside surface of the drum 10 is a permeable cloth 22, such as canvas, which will allow the liquid, upon the compartment being placed under vacuum, to pass through causing the solids in suspension to adhere to the surface of the same to form the filter described. Before the compartments are again immersed in the liquid they are placed under pressure to force the layer of filter from the surface of the canvas and in order to facilitate the removal, scraper bars are employed which particularly form the subject matter for the present invention.

Secured to shaft 11 is a large pulley wheel 24 connected by means of an endless belt 25 to a substantially smaller pulley 26 secured to the transverse shaft 27. The transverse shaft 27 forms supporting means for a smooth surface roller 28, the roller being positioned adjacent but spaced from the main drum 10 and mounted for rotation in bearings 30 secured to the supporting beams 31. The idler pulley 32 is mounted upon a stud 33, the stud being secured to a pivotally mounted plate 34. Adjustable screw means 35 provide for adjustment of the position of the pulley 32 and thus the same functions to take up the slack in the endless belt 25.

Pivotally mounted on the shaft 27 at the respective ends of the roller 28 are supporting members 36. One end of each of the members 36 is bifurcated to form spaced arms 37 and 38, the arms 37 having secured thereto the upper transverse scraper bar 40, while the lower arm 41 of the supporting members has secured to it the lower transverse scraper bar 42. The scraper bars are positioned so as to have engagement with the periphery of the drum 10 and roller 28 respectively and as a means for resiliently maintaining the same in engagement a shaft 43 provided with a handle 44 secured to the arm 38 and is associated at its lower end with any suitable form of coil spring located in the housing 45. The housing 45 is pivotally secured at 46 to the supporting beams 12 and by adjustment of the nut 47 variable tension can be exerted upon the supporting members 36 to vary the tension exerted by the scraper bars against their respective drums.

For removing the filter cake as the same is discharged by the rotating roller 28 an endless conveyor 50 is provided mounted upon roller means 51. A chute 52 is disposed between the roller 28 and the conveyor 50 for directing onto the conveyor any material removed from the roller by the scraper bar 42.

Due to the difference in size of the driving pulley 24 and the driven pulley 26 the roller 28 has a high speed of rotation with relation to the drum 10. The high peripheral speed of the roller is thus employed to remove the filter loosened from the surface of the drum 10 by the scraper bar 40. The relation and operation of the parts is such that the layer of filter from the surface of the drum is removed by the scraper bar 40 and although the bar presents a certain amount of friction to the sliding of the layer of filter thereover, the width of the bar is not great enough to cause the filter to pile up, under which conditions the filter can only be removed in lump form of varying size and consistency. As the layer of filter is deposited upon the rotated roller 28 it is broken off from the layer remaining on the scraper bar 40 and is discharged into the moving conveyor 50. This results from the fact that the peripheral speed of the roller is in excess of that of the drum, and thus the filter is automatically formed into blocks of substantially uniform size and presented to the conveyor for further operation. In the event that some of the filter may adhere to the roller, a scraper bar 42 is provided, resiliently engaging the lower part of the roller and actuated by means of the same resilient mechanism, that applies tension to the scraper bar 40.

It is to be understood that I do not wish to be limited by the exact embodiment of the device shown, which is merely by way of illustration and not limitation, as various and other forms of the device will of course be apparent to those skilled in the art without departing from the spirit of the invention or the scope of the claim.

I claim:

In an apparatus for filtering liquids, a drum partly immersed and adapted to rotate in said liquids, permeable means secured to and forming the periphery of said drum, means drawing the liquids through said permeable means to deposit a filter cake on said periphery, a scraper resiliently engaging the periphery of said drum for removing the cake therefrom in a continuous sheet, and a rotating roller associated with the scraper for receiving the filter cake, said roller having a peripheral speed in excess of that of the drum whereby the filter cake on the roller is severed from the continuous sheet and delivered by said roller in blocks of substantially uniform size.

WALTER E. HADLEY.